United States Patent [19]

Burgess et al.

[11] Patent Number: 4,890,802
[45] Date of Patent: Jan. 2, 1990

[54] APPARATUS FOR CAPTURING SECURING AND TRAVERSING REMOTELY PILOTED VEHICLES AND METHODS THEREFOR

[75] Inventors: R. Anthony Burgess, Toronto; Geoffrey Cunliffe, Mississauga; Atef Tadros, Brampton, all of Canada

[73] Assignee: Indal Technologies Inc., Mississauga, Canada

[21] Appl. No.: 200,925

[22] Filed: Jun. 1, 1988

[30] Foreign Application Priority Data

Jun. 1, 1987 [CA] Canada ................................. 538532

[51] Int. Cl.⁴ ........................... B64C 25/32; B64F 1/12
[52] U.S. Cl. ................................. 244/115; 244/17.17; 244/100 R
[58] Field of Search ................... 244/114 R, 115, 116, 244/63, 17.17, 100 R

[56] References Cited

U.S. PATENT DOCUMENTS

| | | | |
|---|---|---|---|
| 2,807,429 | 9/1957 | Hawkins, Jr. et al. | 244/116 |
| 3,075,731 | 1/1963 | Bennett et al. | 244/115 |
| 3,151,826 | 10/1964 | Michel | 244/115 |
| 3,302,908 | 2/1967 | Lazareff | 244/115 |
| 3,502,286 | 3/1970 | Warren | 244/115 |
| 3,830,452 | 8/1974 | Seay | 244/116 |

Primary Examiner—Joseph F. Peters, Jr.
Assistant Examiner—Rodney Corl
Attorney, Agent, or Firm—Ivor M. Hughes

[57] ABSTRACT

An RPV for use on shipboard, the RPV having a lower support (for example a plurality of legs) comprising a plurality of broad pads at the lower end, a downwardly extending probe (or finger) extending from each pad, the lower end carrying wings within the probe that may be extended from the probe to extend laterally for securing below a grid through which each probe (or finger) may extend.

3 Claims, 11 Drawing Sheets

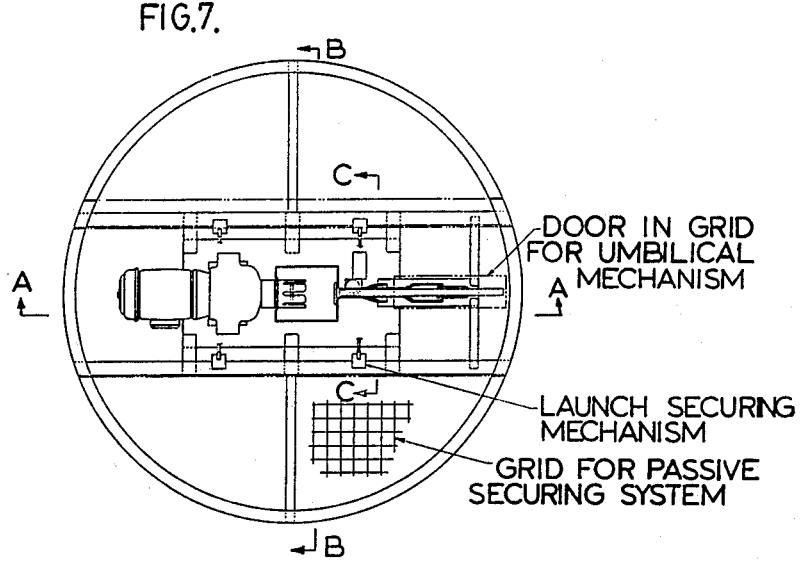
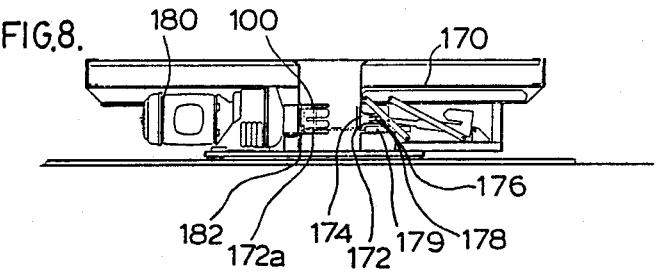
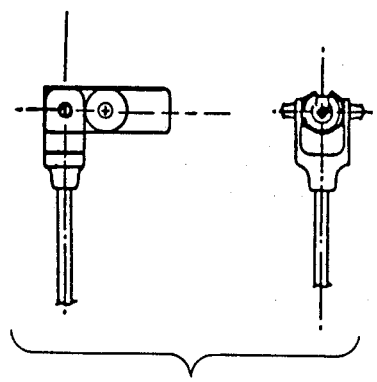
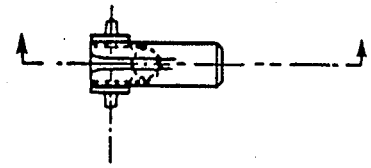

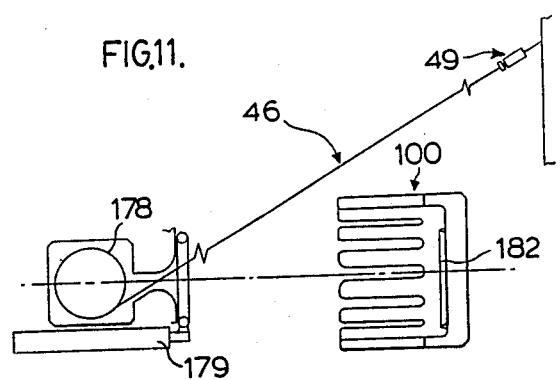
FIG.11.
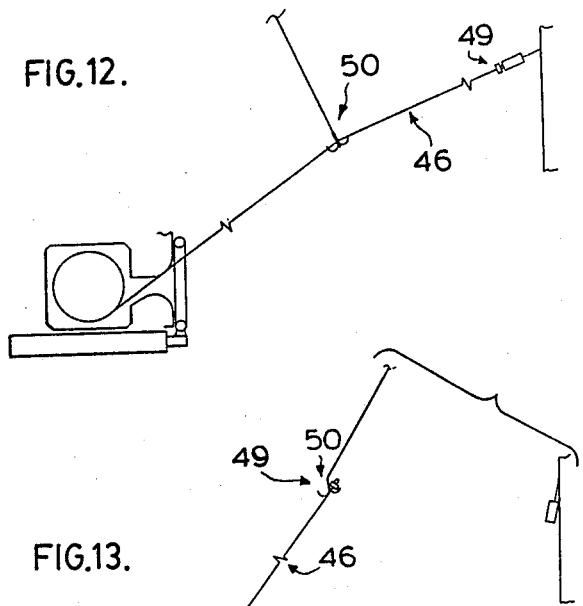
FIG.12.
FIG.13.

APPARATUS FOR CAPTURING SECURING AND TRAVERSING REMOTELY PILOTED VEHICLES AND METHODS THEREFOR

FIELD OF INVENTION

This invention relates to methods and apparatus for capturing and/or securing and/or traversing remotely piloted vehicles (RPV) or unmanned air vehicle (UAV) and finds particular application to shipboard VTOL vehicles.

BACKGROUND OF INVENTION

It is now widely accepted that RPVs have the potential to fill several significant military roles. The majority of the effort to date has addressed land based RPV systems and very little has been done on the development of ship based systems.

Use of RPVs in the Naval environment [Shipboard Launch and Recovery system (SLAR) [also known as Launch, Recovery Securing, Handling (LRSH) Equipment of the RPV] adds a number of new challenges. For the proposed short range RPV in particular, operating from frigate sized and smaller ships means taking off from, and landing on, an unstable moving deck, with severe airwake turbulence from the superstructure and very tight space constraints both during operation and stowage. A strong trend is already emerging in favour of RPVs with a VTOL capability for the maritime role because of the demonstrated difficulties of landing a fixed wing air vehicle on even relatively large and stable ships' decks. On land, the VTOL RPV requires little or no launch and recovery support and hence this area of development has been largely ignored. In the shipboard application this is not true.

Requirements for launch, recovery and handling systems are only just starting to be formulated. However, a consensus is emerging that RPVs should be capable of operating off frigate sized ships in at least sea state 3 with 10° roll, 3° pitch (typically) and ideally up to sea state 5 with 30° roll, 10° pitch compatible with current U.S. and Canadian Navy helicopter operational limits.

Initial RPV placements will probably be on ships which are already operating with one or more helicopters; however, the system must also be adaptable to smaller, non-flight deck equipment ships. On existing flight decks, the goal must be to complement the helicopter capability rather than to displace it. To this extent, the RPV must operate on a non-interference basis and share the already cramped quarters in the hangar. The RPV system must require minimal additional crew members for operation or maintenance, as well as minimizing any additional skill levels.

There are five (5) distinct phases in the launch, recovery and handling of RPVs from small ships; recovery assistance, securing, traversing or deck handling, stowage and of course launch.

Recovery assistance requirements will, to a great extent, depend on the stability characteristics of a number of elements–the UMA, the operating envelope limits and the ship motion and associated airwake turbulence.

A very stable and controllable air vehicle operating in relatively calm conditions may not require any specific recovery assistance other than that provided by the normal RPV operator.

In higher sea states and/or with a less stable air vehicle the operator workload will increase dramatically to the point where some form of recovery assistance becomes mandatory. The Naval helicopter pilot has difficulties under such conditions. The situation is even worse for an RPV operator for several reasons. Although the operator can maintain good visual contact with the RPV, he lacks the "seat of the pants" acceleration feedback. He also has difficulty in judging RPV position since he is, most likely, looking up at the RPV and has no references in the background to provide visual cues as to the RPV's position relative to the ship. Finally, the RPV being a much smaller craft, is far more susceptible to wind shears and high frequency turbulence in the airwake behind the ship's hangar or other superstructure.

Whatever form of recovery assistance is provided, the goal must be to eliminate flight deck personnel during launch and recovery operations.

It is therefore an object of this invention to provide an apparatus suitable for use on shipboard for the recovery of RPVs.

Once landed, the RPV needs to be secured as quickly as possible; ideally before the end of the quiescent period to avoid it sliding across the deck (or worse still, toppling) during the next roll or pitch cycle.

In benign conditions, this may be able to be achieved manually. At higher sea states, an automatic or remotely operated securing device becomes even more essential. Furthermore, a securing system design is also complicated by the diversity of undercarriage configurations proposed for RPVs; for instance four legs, a continuous ring, or skids, and possibly even wheels.

It is therefore an object of this invention to provide such apparatus which permits rapid securement of the RPV to the apparatus minimizing the number of personnel involved. Once on the deck, the RPV must be moved either out of the way to allow helicopter operations, or to a suitable point for refueling, changing payload, dismantling or maintenance, or to a long term stowage area in the hangar or elsewhere.

Although much smaller than a helicopter, the typical RPV still weighs several hundred pounds (one RPV being in the order of about 440 lbs., about 5'6" tall, 24" in diameter and having a rotor diameter of 9') and is not man portable without considerable disassembly. Since disassembly on the flight deck can only be considered in the most benign conditions without putting the vehicle and deck personnel at risk, a handling device is necessary to maintain the security of the RPV. Furthermore, the entire handling phase of both launch and recovery operations must take place quickly and efficiently in order to restore the flight deck to a "ready" status for helicopter operations.

It is therefore an object of the invention to provide some such apparatus which integrates the securing and traversing/handling of the RPV so that the same device performs both functions. This would decrease mission time to launch and traverse since the vehicle would be married to one device for both functions, no time would be lost in changing devices for the next activity. In addition, loss of security during transfer from one device to another would be totally avoided. Further transfer of the RPV from its landing spot to the launch point would be simplified.

In its simplest form, according to one aspect of the invention, a landing and securing platform can be provided for the landing of an RPV thereon and can be released from the landing point to become a dolly which may be maneuvered manually to and from a hangar. Alternatively, the platform can be secured by cables and winched across the flight deck. Ideally to preserve maximum security, the platform is guided along and restrained by some form of track or rail. This track could be either an existing track or a separate lightweight surface mounted track. Any track installation of course must not interfere with helicopter operations or be subject to damage during vertical replenishment. If an existing track is used, the platform should have a means of disengagement from the track inside the hangar, and preferably an auxiliary track to take it to its stowage area.

Idealy, RPV stowage must provide shelter from the environments in both a "ready use" area and a long term storage and maintenance area. In the case of helicopter equipped ships, neither of these areas must interfere with helicopter operations. This represents a significant challenge in an already limited space, especially since it is expected that three or more RPVs will be carried, each of which may have different payload packages and each of which will presumably require a capability for random selection.

The integrated landing/securing/traversing platform can also be used for ready use stowage and to move the RPV into the hangar where it can be broken down for long term stowage. Suitable lifting gear may be provided inside the hangar to allow transfer of complete RPVs or major subassemblies to and from stowage racks.

The launch sequence is essentially the reverse of the landing securing and traversing sequence. The launch/recovery platform preferably provides an umbilical connection to the RPV for the above start up sequences together with a quick release arrangement for both the umbilical connection and the RPV securing device. The launch is almost as critical as the landing phase since the RPV must be released cleanly and lift off during a quiescent period. It is thus a further object of this invention to provide apparatus which permits RPVs to be landed efficiently and safely and methods of its use permitting such safe and efficient landing.

Further and other objects of the invention will be realized by those skilled in the art from the following summary of invention and detailed description of the embodiments thereof.

SUMMARY OF INVENTION

Typical RPVs which may be captured, secured and/or traversed by apparatus according to the invention may be:

(a) Canadair "Sentinel" CL-227 remotely piloted vehicle;

(b) Aerodyn "Pagasus" CH-84 remotely piloted vehicle (from Aerodyne Systems Engineering [ASE]);

(c) Bell/Boeing D340 "Pointer" remotely piloted vehicle.

However, it should be understood that use of the invention is not limited thereto. Therefore, according to one aspect of the invention, an RPV is provided, the RPV comprising a plurality of broad pads at the lower end thereof, a probe extending downwardly from each pad, each probe carrying wings within the probe that may be extended from the probe to extend laterally for securing below a grid through which each probe may extend to preclude vertical movement of each probe (or finger). In this regard, because the wings can be retracted into the probe when the RPV is to be released from the system (for example for launching) and be extended laterally to extend beyond cables, wires or rigid bars defining a grid, it is apparent the grid may be singular or overlying stacked grids.

Thus according to another aspect of the invention, a capturing, securing and traversing system for an RPV is provided suitable for use on shipboard, the system comprising a grid comprising rigid cables or wires crossing one another for receiving a probe therethrough, the RPV having a lower support (for example a plurality of legs or a ring or frame) comprising a plurality of broad pads at the lower end thereof to each sit on the grid without penetrating the grid, the undersurface of the pads carrying a downwardly extending probe (or finger) of a length sufficient to pass through both grids, the lower end of the probes each carrying means to temporarily expand the lower end of probes to preclude the withdrawal thereof from the grids. The lower end of the probe may carry a plurality of wings (as the means to temporarily expand the lower end of the probes) retractable into the body but upon being extended, extends transverse the length of the probe to preclude probe withdrawal.

According to another aspect of the invention, an RPV is provided comprising a lower support (for example, a plurality of legs or a ring), comprising a plurality of broad pads suitable for sitting on an RPV securing system (for example, a grid system), without the pads penetrating through the securing system, the pads carrying a downwardly extending probe (or finger) of sufficient length to pass through the grid system, each probe carrying within the probe a pair of laterally extendable wings for securing the RPV to a securing system when the pads sit on the securing system and are retractable (for example, by pivoting) into the probe when the RPV is to be launched. The pair of laterally extendable wings may be spring loaded and urged to extend normally laterally from the probe and which wings may be held in a folded vertically extended position within the probe by a pin for example engaging the wings within the probe.

According to another aspect of the invention, the broad pads may comprise a downwardly directed recess opening downwardly for receiving an annulus surrounding the probe (fingers) and carrying a downwardly directed surface on the underside of the annulus for engaging the securing system, the annulus carrying resilient means (for example, a pair of diametrically disposed radially spring loaded pins urged towards the centre of the annulus) for being moveably secured to the pin, the pin extending vertically through the probe for engaging the wings and carrying a pair of vertically spaced recesses (for example, circumferential grooves) for receiving the resilient means (for example, spring loaded pins), downwardly extending spring means between the resilient means and a fixed portion normally urging the annulus downwardly whereby:

(a) when the RPV is launched and in the air, the wings are folded, caused by the pin engaging the wings, the resilient means in the annulus are in the lower recess and the annulus is spaced below the recess;

(b) when the RPV has engaged a grid system, the annulus of each probe is pushed up into the downwardly opening recess, and the pin carried in the probe is elevated by the elevation of the annulus and thus the resilient means causes the pin to be raised with the annulus, releasing the wings to extend laterally (radially);

(c) when the RPV is ready for launching the pin may be depressed (either manually, mechanically, or electrically) folding the wings into the probe with the resilient means of the annulus moved into the upper recess in the pin and the annulus is in the recess; and (d) after the RPV has been launched, the annulus is depressed by the downwardly extending spring means out of the upper recess into the lower recess.

Each of the above systems (for example grids and platforms) may be mounted for movement on the ship deck. In this regard, each of the systems may be pinned to a cable and may be traversed on the ship deck (for example either in a surface mounted track or in a track permanently constructed in the deck).

The RPV may carry means for engaging a snag line carried as part of the system which "snags" the means on the RPV and assists the RPV to a safe landing. The "snag" line may extend from a winch unit proximate the proposed landing area of the RPV to a position on the ship to which it is removably secured. The means on the RPV may be a line extending from the RPV and a hook on the end. Instead of a hook, a ball may be provided. The end of the snag line may comprise complementary means for holding the means (for example hook or ball) on the end of the line on the RPV thereto as the snag line is winched in. Thus if the RPV engages the snag line at a point intermediate its ends, the hook or ball slides down the snag line as the snag line is winched or reeled in until the hook or ball for example engages the complementary means at the end of the snag line which it becomes engaged by or secured to.

The winch unit may comprise an eddy current clutch system for operating a crenelated winch drum (a drum with open-ended slots).

The snag line may also be reeled in with the RPV line secured to it by a separate reel which carries a mouth into which the snag line and line on the RPV are directed. In one embodiment, the reel carries a vertically disposed ring which is larger than the means on the end of the line secured to the RPV and complementary means on the snag line which pass therethrough. The ring may be aligned with the crenelated winch drum and a cylinder (for example hydraulic, pneumatic) or linear electrical activator (operated by a motor, gears and lead screw for example) or other means may be used to transport the ring into the winch drum carrying at least the line of the RPV into the winch drum which may then be activated to wind the RPV line. Because the RPV line is not long, the winch drum may be rotated only about 30 times and thus the "snag" line will turn only about 30 times in 1½" lateral distance between the winch unit and reel, the provision of a swivel will prevent the twisting of the snag line.

According to another aspect of the invention, a snag may also be provided which funnels means on the end of a line of RPV to be guided to be connected to the snag.

The snag may couple one end of a snag line with the end of the line extending from the RPV, for example a ball on the line from the RPV into a socket on the end of the snag line from the platform.

BRIEF DESCRIPTION OF THE DRAWINGS

The invention will now be illustrated with reference to the following drawings of embodiments of the invention in which:

FIG. 7 is a top view of a reel and crenelated winch drum used to secure the snag line and line carried by the RPV.

FIG. 8 is a side view thereof.

FIGS. 9 and 10 are close-up portions of a line from an RPV being secured to a snag line.

FIGS. 11 to 15 are close-up views of portions of the apparatus in FIGS. 6 and 7 being used to secure the RPV.

DETAILED DESCRIPTION OF PREFERRED EMBODIMENTS OF THE INVENTION

Figure 1:
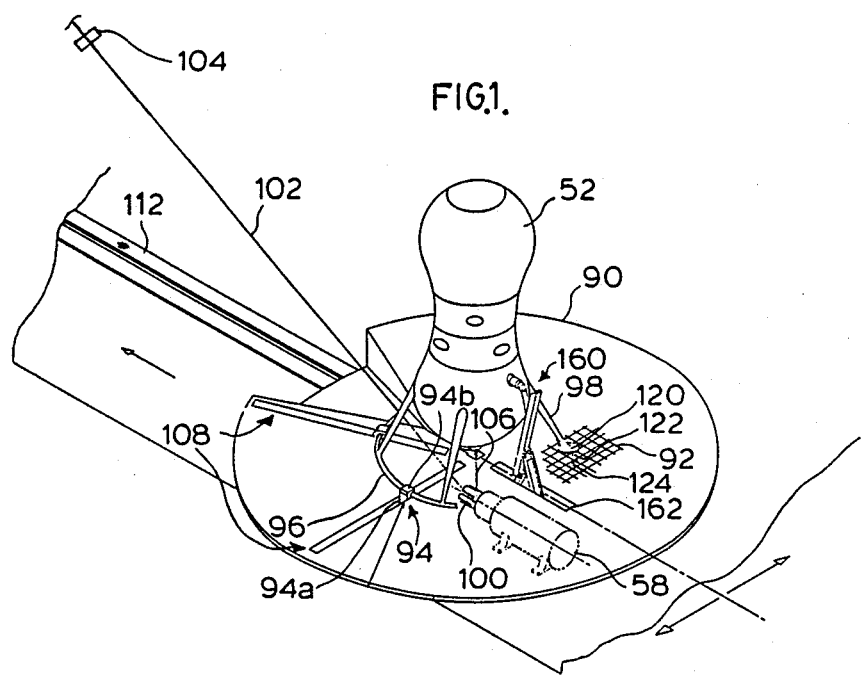
FIG. 1 is a schematic of two securing systems used to secure an RPV.

With reference to FIG. 1, RPV 52 is shown on a launch recovery platform 90, split to show two alternative securing systems 92 and 94 for the legs 98 and ring 96 under carriage support respectively. Crenelated winch drum 100 carries snag line 102 which extends to a fitting 104 of the ship and is used to snag line 106 from the RPV by means not shown on an end which is secured into the drum 100. Winch drum 100 is operated by an eddy current clutch system within winch 58.

Figure 17:
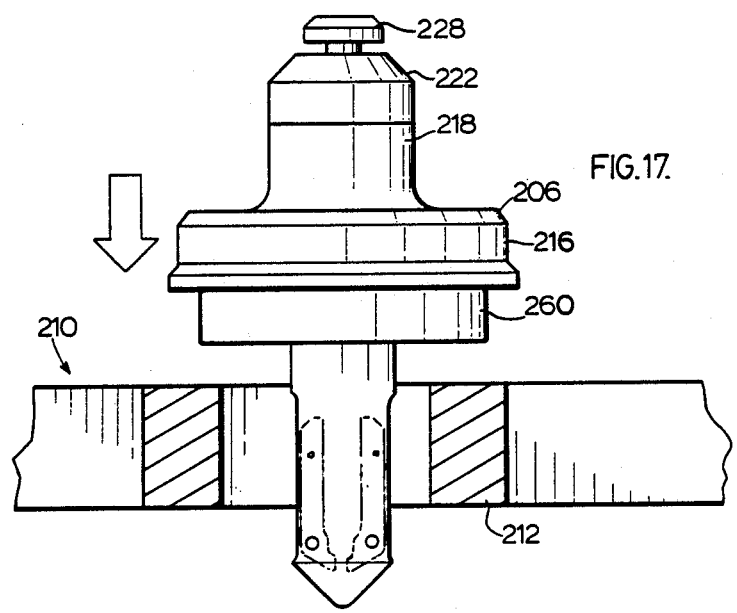
FIG. 17 is a close-up of one of the components shown in FIG. 16 passing through part of the grid system.
Figure 18:
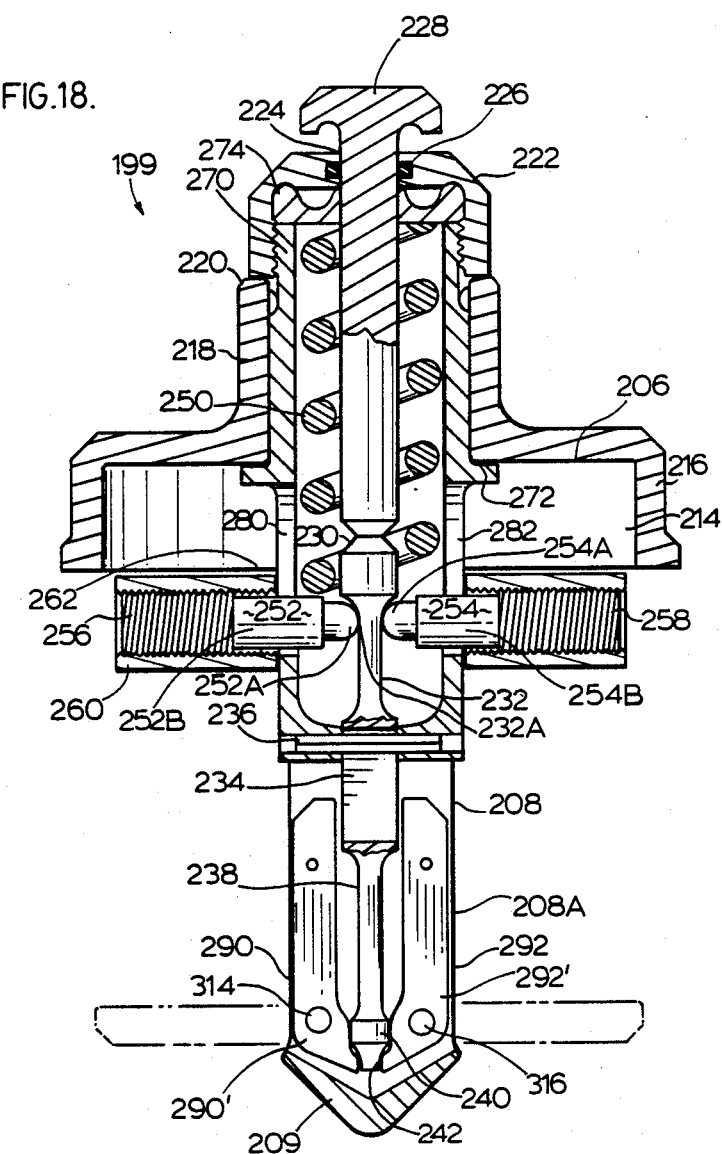
FIG. 18 is a cross-sectional view taken through the component shown in FIG. 17.

System 94 for securing ring 96 consists of a series of vertically extending arms 94A and laterally or horizontally extending fingers 94B secured to move in radially extending slots 108 driven by lead screws 110 shown in FIGS. 17 and 18. As is apparent, arms 94A and transverse portions 94B comprise clamping fingers which are driven by lead screws 110 towards and away from the center of platform 90 for clamping over ring 96 and securing the RPV to the platform. Additionally, by simultaneously synchronizing the movement of each of the lead screws 110 provided for each arm 94, the RPV 52 can be moved and centered on the surface of the platform.

With reference to FIG. 1, surface mounted track 112 comprises a cable secured or pinned to platform 90 for the movement of platform 90 along surface track 112 from a launch and recovery position shown in FIG. 1 to a standby position shown in FIG. 1 or into a stored position in the hangar.

The alternative system for securing the legs 98 of the RPV 52 consists of a probe-type attachment on each leg, for example of the RPV 52, comprising pad 120 on the underside of which projects downwardly extending probe 122.

Figure 2:
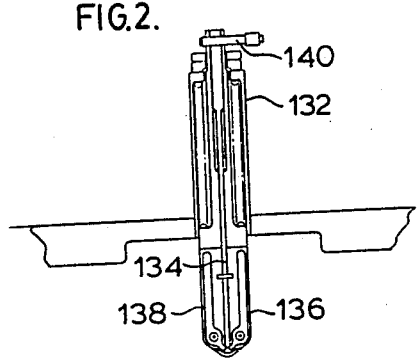
FIG. 2 illustrates a cross sectional view of one probe used to penetrate a grid.
Figure 3:
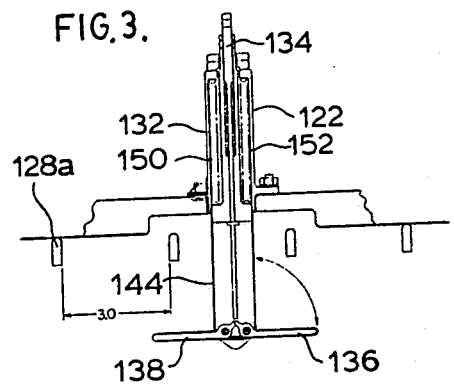
FIG. 3 is a side view of the internal wings extended from the probe to extend laterally after the probe is penetrated to the grid surface.
Figure 4:
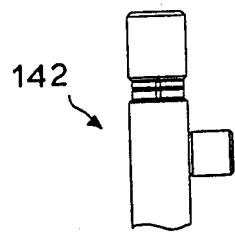
FIG. 4 illustrates the fact that the probe may be solenoid operated.
Figure 5:
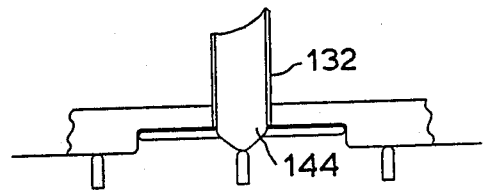
FIG. 5 illustrates the position of the probe should it engage a wire or cable in which event it is retracted into a housing shown in FIG. 11.
Figure 6:
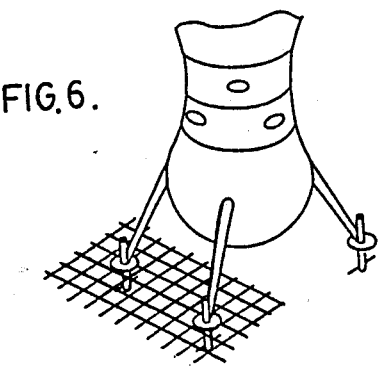
FIG. 6 illustrates an RPV carrying such probes.
Figure 14:
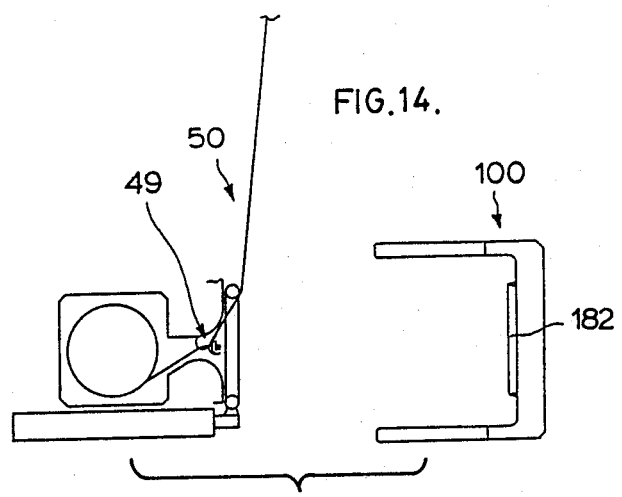
Figure 15:
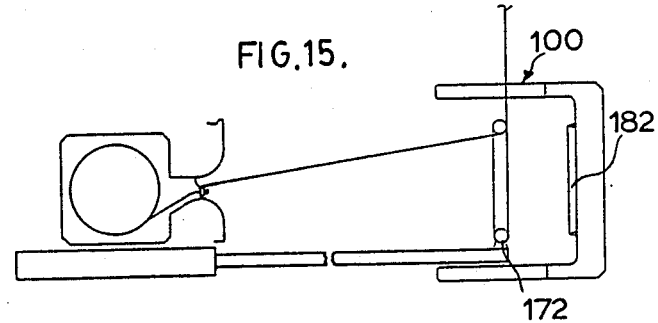

With reference to FIGS. 2 to 5 inclusive, each probe 122 comprises outer housing 132 carrying inside, vertically extending pin 134 which presses ends of each wing 136 and 138 secured to pivot within slots (not shown) from the vertical position within the housing shown in FIG. 2 to the laterally pivoted position shown in FIG. 3 by the raising of the pin 134 whereby wings 136 and 138 are released and being spring loaded extended laterally through the slots (not shown). This may be done manually as shown in FIG. 2 by lever 140 or by solenoid system 142 shown in FIG. 4. As is apparent when the RPV lands, one or more probes may engage a mesh 128a shown in FIG. 5 and may lie thereon. To prevent the RPV from toppling, each probe is spring loaded within an outer housing so that the probe end 144 may slide upwardly in housing 132 against the action of compression springs 150 and 152 from the position shown in FIG. 3 to the position shown in FIG. 5 while the remaining legs enter the spaces between the cables or wires 124 and 126. (See FIG. 6.) Because of the use of the wings 136 and 138, only one rigid grid system 128A is provided. (See FIGS. 11, 12, 13, 14 and 15.)

With reference to FIG. 1, umbilical connection and release mechanism 160 and the additional electrical units for engine start sequencing project through slot 162 of platform 90. As RPV 52 is guided to have hook of line 50 engage snag line 46 and after snag line is thereafter released from the fitting at end 49, the hook slides to fitting 49 wherein it becomes locked to the fitting. In this regard, see FIGS. 11 to 15 and FIGS. 9 and 10. FIGS. 9 and 10 illustrate the hook (or ball) becoming lodged in a socket after being guided therein. Thereafter the RPV may be drawn towards the platform using winch drum 100 (crenelated winch drum 100 winch drum with open ended slots) where it is wound up and held. In another embodiment to separate the snag line from the winch drum, a separate reel system is provided and in this regard see FIGS. 7 and 8. Reel 170 comprises a take up drum for winding the snag line which enters the reel 170 through ring 172 disposed at the mouth 174 leading into the reel 176 from which the snag line is played out or taken up. Ring 172 can be extended transversely to a position (the dotted line position) 172A (see FIG. 20) by cylinder 178 extending away from a mouth 174 towards winch drum 100 which is operated by an eddy current clutch system 180.

Thus with reference to FIGS. 7 and 8 (and FIGS. 11 and 15 inclusive) after the hook end of line 50 of RPV 52 has been secured to the end 49 of the snag line 46 and the snag line is reeled in through a ring 172 into mouth 174 onto reel 178, it will pull the RPV 52 until the line 50 enters through ring 172 at which point ring 172 will be pushed laterally by cylinder 179 to within crenelated winch drum 100 (slotted winch drum 100) (see FIG. 8) and the RPV line will be wound by winch drum 100 with line 50 extending out one of the slots to permit the winding. (See FIGS. 11 and 8.) In the event of problems, ring 172 may be extended further to cause line 50 to engage cable cutter shown as 182.

As is apparent from FIG. 7, the RPV is landed and secured generally in the center of the landing target as shown. Thus, an RPV has been captured, pulled in under tension using an eddy current clutch system and centered in the landing target. With this device, landing of an RPV can be repeatedly accomplished into a small defined target area.

Figure 16:
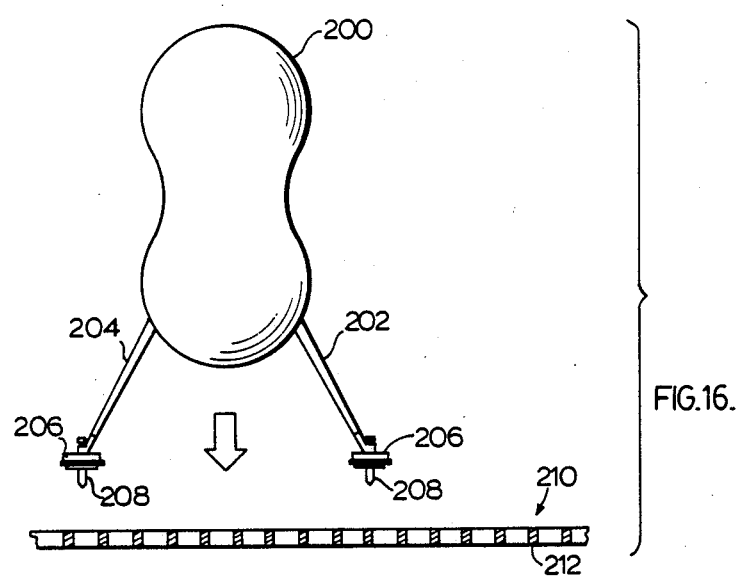
FIG. 16 is a side plan view of an RPV about to land on a grid system on board a ship.
Figure 19:
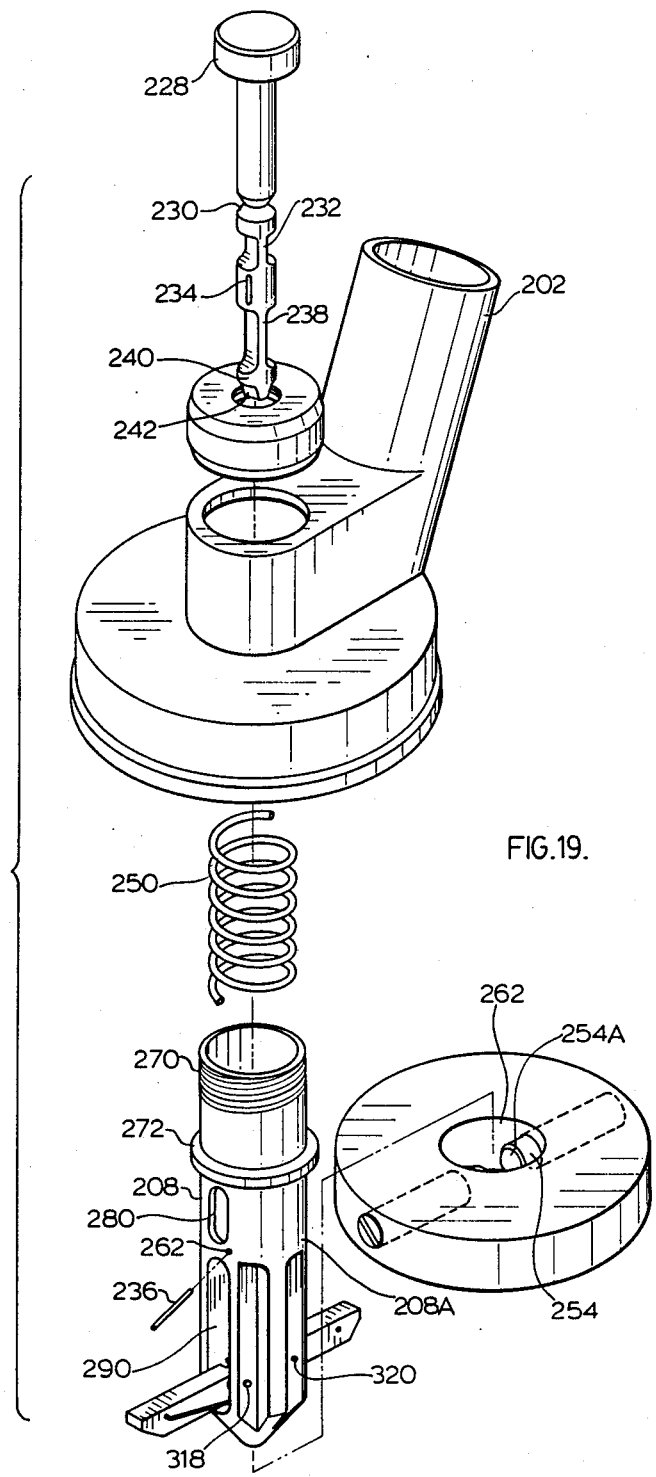
FIG. 19 is an exploded view illustrating the components making up the components shown in FIGS. 17 and 18.

With reference to FIG. 16, RPV 200 is provided comprising a plurality of four legs, two of which are shown at 202 and 204. Each leg carries securing means 199 comprising a broad pad 206. Each pad 206 carries a downwardly extending probe or finger of sufficient length to pass through each aperture of grid system 210 made up of horizontally-extending intersecting rail members 212. Each pad 206, shown best in FIGS. 17, 18 and 19 comprises an outer wall 216 defining together with pad 206 a downwardly opening recess 214 directed downwardly from pad 206. At the center of pad 206 is upstanding annular wall 218, the top end of which 220 (see FIG. 18) carries cover 222 carrying aperture 224 through the top thereof carrying sealing ring 226 surrounding aperture 224. Extending downwardly from cover 222 through aperture (provided for friction damping purposes) 224 through ring 226 is pin 228 which carries circumferentially extending upper groove 230, vertically extending circumferential groove 232 which is spaced below groove 230 and is elongated vertically, and vertically extending slot 234 (see FIG. 19 as well as FIG. 18) for receiving pin 236 see FIGS. 18 and 19. Pin 228 is narrowed proximate the bottom portion thereof at 238 at the end of which is enlarged head 240 tapering at 242 in the manner shown in FIG. 20 (like a flathead screwdriver) as at 242.

Probe 208 comprises a circular housing wall 208A terminating in conical lower cap 209. Surrounding pin 228 is compression spring 250 normally extending in the position shown in FIG. 18 for abutting a pair of diametrically disposed radially spring loaded pins 252 and 254 mounted in sleeves 256 and 258 respectively of annulus or puck shaped structure 260 comprising a central aperture 262 through which probe 208 extends. Pin heads 252A and 254A are compressible (against springs (not shown)) into the sleeves 252B and 254B respectively of pins 252 and 254. Wall 208A of probe 208 comprises an aperture 262 through which pin 236 passes through slot 234 of pin 228. Thus pin 228 is locked to preclude rotation relative to annular wall 208A of probe 208 but is free to slide vertically therein so that the orientation of pin head 242 is maintained (see FIG. 20).

Probe wall 208A extends upwardly to its upper end where it is secured by threading at 270 to cap 222. Wall 208A carries radially extending flange 272 for supporting the lower end of pad 206 thereby (together with cover 222) fixing pad 206 relative to probe 208. Compression spring 250 thus extends between disc 274 and pins 252 and 254. It is apparent that if annulus 260 is moved upwardly from the position shown in FIG. 18 to the position shown in FIGS. 21 and 22 annulus 260 must rise into recess 214 which recess is of a size to accommodate annulus 260. In doing so it is apparent that pins 252 and 254 compress compression spring 250 against disc 274 (see FIG. 18) and exert an upward pressure on pin 228 thereby elevating annulus 260 into recess 214 and elevating pin 228. This occurs when annulus 260 engages the grid 210 by engaging rails or wires 212 (see FIGS. 17 and 22). If pin 228 is pushed downwardly, which may be accomplished either manually, mechanically or electrically by a solenoid, (see FIG. 4), because annulus 260 is sitting on grid system 210, the pin heads 252A and 254A are pushed radially inwardly by broadened pin portion 232A as pin 228 is depressed, passing into groove 230. Annular wall 208A carries vertically elongated opposing slots 280 and 282 in side wall 208A one of which is shown at 280 in FIG. 19 and both of which 280 and 282 are shown in cross-section in FIG. 18. Annular wall 208A also carries colinear elongated longer elongated slots 290 and 292 (see FIGS. 19 and 18) colinear to slots 280 and 282 respectively. Secured for pivoting from a vertically oriented position to a laterally radially extending position are a pair of spring loaded wings 290' and 292' (see FIGS. 18 and 19).

Figure 20:
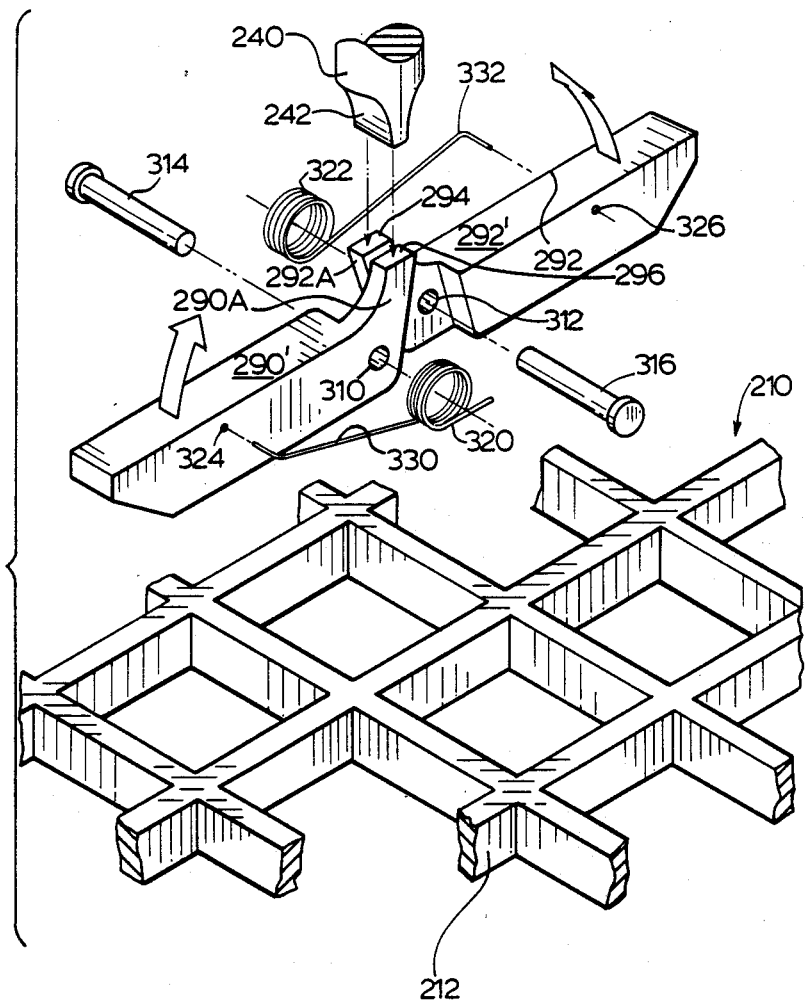
FIG. 20 illustrates an exploded view of some of the components making up part of the overall structure shown in FIGS. 17, 18 and 19.

With reference to FIG. 20, wings 290' and 292' carry projections 290A and 292A which are aligned with one another so that the combined width thereof totals the width of each of wings 290' and 292' which have been aligned. The top surfaces 294 and 296 of each of members 290A and 292A, are in the same horizontal plane when the wings are extended in the position shown in FIG. 20 in use. Each of portions 290A and 292A each carry an aperture 310 and 312 respectively, through the end thereof remote top surfaces 294 and 296 proximate wings 290' and 292' respectively. Apertures 310 and 312 have been provided for each receiving pins 314 and 316 respectively from opposite directions (see FIG. 20). Pins 314 and 316 also carry springs 320 and 322, one arm of which is secured to each wing 290' and 292' in apertures 324 and 326 by arms 328 and 330 respectively extending from torsion springs 320 and 322 respectively and the other arm of which is provided to abut the inner side wall 208A of probe 208 to permit each spring to act as a torsion spring. Pins 314 and 316 are secured through apertures 318 and 320 in side wall 208A (see FIG. 19).

With reference to FIG. 20 flathead end 242 of pin 228 is vertically aligned with portions 294 and 296. Therefore vertical engagement by portion 242 with portions 294 and 296 causes each of the wings 290' and 292' to pivot about pins 314 and 316 respectively to a vertically aligned position shown in FIG. 18. When pin 228 is raised, wings 290' and 292' by the action of torsion springs 320 and 322, are caused to spring laterally to the position shown in FIG. 19.

With RPV 200 in the position shown in FIG. 16 prior to landing on grid 210, the securing means 199 shown in cross-section in FIG. 18 is in the position shown in FIG. 18 with the wings pivoted vertically by the pin 228 and particular lower end 242 having depressed and pivoted surfaces 294 and 296 and thus wings 290' and 292' to be positioned on either side of lower end 242 with the pin heads 252A and 254A in groove 232 and annulus 260 spaced downwardly from recess 214.

Figure 21:
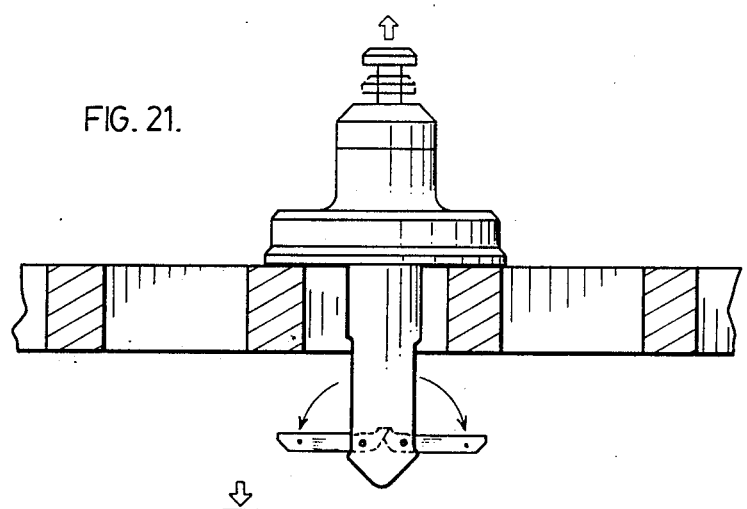
FIGS. 21 through 23 inclusive illustrate the different modes of operation of the components shown in FIGS. 17, 18 and 19.

With reference to FIG. 17 as probe passes through an aperture in grid system 210 between grid wires or rails 212, annulus 260 which is broader in diameter than adjacent parallel rails or wires 212 sits on a pair of adjacent rails 212 (see FIG. 21). As each pad does so annulus 260 is pushed upwardly into recess 214 thereby compressing spring 250 between pins 252 and 254, and disc 274 causing pin 228 to rise to the position shown in FIG. 21 through slots 290 and 292. When pin 228 rises wings 290' and 292' are permitted extend laterally as shown in FIG. 21. This occurs when the RPV 200 lands.

Figure 22:
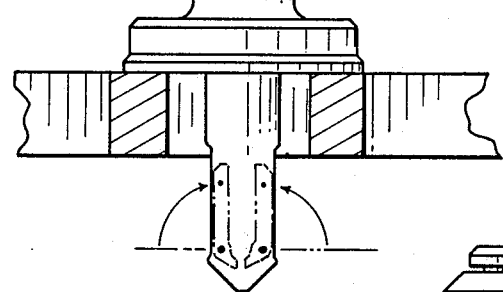
Figure 23:
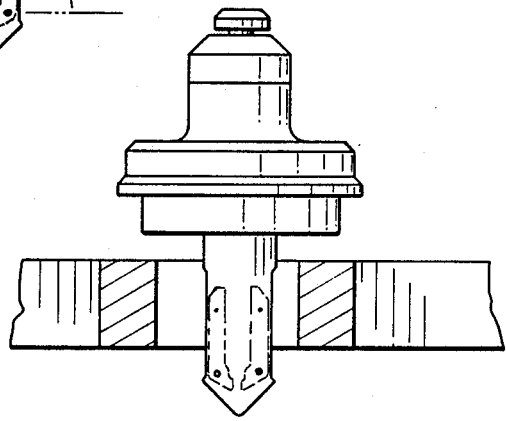
Figure 24:
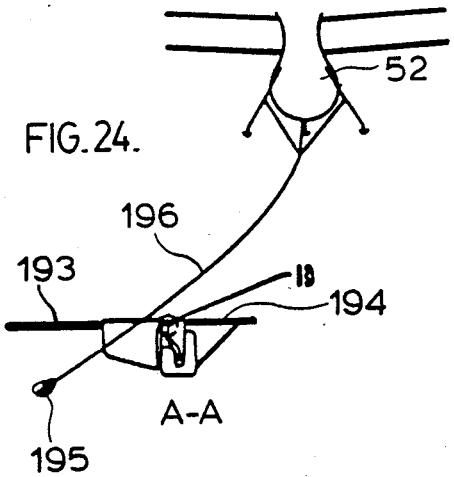
FIGS. 24, 25, 26 and 27 illustrate the securing of the line from the RPV to a supported connector having been guided into the connector shown in side view in FIG. 26.

When it is desired for the RPV to be launched, wings 290' and 292' must be retracted and in this regard and with reference to FIG. 22 the head of pin 228 is depressed as shown causing portion 242 to extend onto co-planar top surfaces 294 and 296 (see FIG. 20) swinging wings through slots 290 and 292 into their vertically oriented position within probe 208 within annular wall 208A. The depression of pin 228 may be manually, mechanically or electrically using solenoid shown in FIG. 4. As the pin is depressed the spring loaded pin heads 252A and 254A are caused to move radially inwardly subsequently entering groove 230 and wings 290' and 292' are pushed to their upright position. Thereafter when RPV 200 is launched, compression spring 250 forces annulus 260 out of recess 214 (see FIG. 23), pushing pins 252 and 254 downwardly from groove 230 into groove 232 returning the securing means 199 to the position and configuration shown in FIG. 18 ready for use in landing the RPV on a grid system 210.

Figure 25:
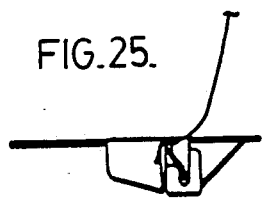
Figure 26:
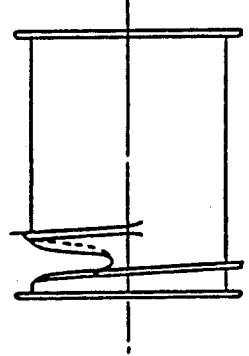
Figure 27:
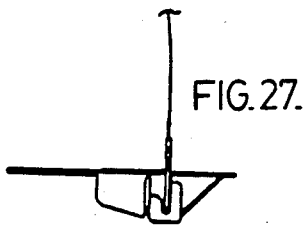

With reference to FIGS. 24, 25, 26 and 27, a V-type structure comprises arms 193 and 194 mounted on the ship deck for guiding the end 195 of an RPV line 196 secured to the RPV 52 to be fitted and locked into a connection shown in FIGS. 25 and 26 to which it becomes secured as shown in FIG. 25.

Thus it is apparent that many changes could be made to the above embodiments without departing from the scope of the invention. It is thus intended that all material included herein be interpreted as illustrative of the invention and not in a limiting sense.

The embodiments of the invention in which an exclusive property or privilege is claimed are as follows:

1. A remotely piloted vehicle comprising a lower support comprising a plurality of broad pads suitable for sitting on a remotely piloted vehicle securing system, without the pads penetrating through the securing system, the pads carrying a downwardly extending probe of sufficient length to pass through the grid securing system, each probe carrying within the probe a pair of laterally extending wings for securing the remotely piloted vehicle to a securing system when the pads sit on the securing system and are retractable into the probe when the remotely piloted vehicle is to be launched, wherein the pair of laterally extendable wings are spring loaded and urged to extend normally laterally from the probe and which wings may be held in a folded vertically extending position within the probe by a pin.

2. The remotely piloted vehicle of claim 1, wherein the broad pads carry a downwardly directed recess opening downwardly for receiving an annulus surrounding the probe and carrying a downwardly directed surface on the underside of the annulus for engaging the securing system, the annulus carrying resilient means for being moveably secured to the pin, the pin extending vertically through the probe for engaging the wings and carrying a pair of vertically spaced recesses for receiving the resilient means, downwardly extending spring means between the resilient means and a fixed portion normally urging the annulus downwardly whereby (a) when the remotely piloted vehicle is launched and in the air, the wings are folded, caused by the pin engaging the wings, the resilient means in the annulus are in the lower recess and the annulus is spaced below the recess;

(b) when the remotely piloted vehicle has engaged a grid system, the annulus of each probe is pushed up into the downwardly opening recess, and the pin carried in the probe is elevated by the elevation of the annulus and thus the resilient means causes the pin to be raised with the annulus, releasing the wings to extend laterally;

(c) when the remotely piloted vehicle is ready for launching the pin may be depressed folding the wings into the probe with the resilient means of the annulus moved into the upper recess in the pin and the annulus is in the recess; and (d) after the remotely piloted vehicle has been launched, the annulus is depressed by the downwardly extending spring means out of the upper recess into the lower recess.

3. The remotely piloted vehicle of claim 2 wherein the resilient means comprises a pair of diametrically disposed radially spring loaded pins urged towards the center of the annulus.

* * * * *